United States Patent [19]

Norell

[11] 3,895,044

[45] July 15, 1975

[54] HALOGENATED β-SULTONES, HALOGENATED ALKENYL SULFONATES, AND THEIR PREPARATION

[75] Inventor: John R. Norell, Bartlesville, Okla.

[73] Assignee: Phillips Petroleum Company, Bartlesville, Okla.

[22] Filed: Feb. 11, 1970

[21] Appl. No.: 10,596

[52] U.S. Cl.............. 260/456 R; 260/327; 424/276; 424/303
[51] Int. Cl............................................. C07c 143/68
[58] Field of Search ................................ 260/456 R

[56] References Cited
UNITED STATES PATENTS

| | | | |
|---|---|---|---|
| 2,667,469 | 1/1954 | Sauer ........................ | 260/456 R X |
| 2,675,371 | 4/1954 | Coover et al. .............. | 260/456 R X |
| 2,695,308 | 11/1954 | Gilbert.......................... | 260/456 R |
| 2,824,139 | 2/1958 | Barnhart et al............. | 260/456 R X |

OTHER PUBLICATIONS

Chem. Abstracts, Vol. 69, 86578d (1968).

Chem. Abstracts, Vol. 66, 94668m (1967).

*Primary Examiner*—Joseph E. Evans

[57] ABSTRACT

A method of reacting halogenated ketones with sulfenes to produce a composition of polyhalogenated sulfonate esters comprising a new class of β-sultones and a new class of alkenyl sulfonates.

2 Claims, No Drawings

HALOGENATED β-SULTONES, HALOGENATED ALKENYL SULFONATES, AND THEIR PREPARATION

This invention relates to new compositions of matter, and particularly, a new class of β-sultones and a new class of halogenated alkenyl sulfonates. In another aspect this invention relates to a method of preparing these polyhalogenated sulfonate esters through reacting halogenated ketones with sulfenes.

The art has shown continuing interest in the development of certain polyhalogenated sulfonate ester compounds. This interest is due in part to the unusual physical and chemical characteristics exhibited by these compounds. Because of the unpredictable behavior of reactants used in preparing polyhalogenated sulfonate compositions, their availability is somewhat limited and not too many classes are known. These compositions are not generally preparable by simple high yield procedures and are occasionally not as stable as is desired.

It is an object of this invention to provide a class of compounds whose structure is novel.

It is another object of this invention to provide a class of compounds which can be used as chemical intermediates, agricultural chemicals such as rusticides, and the like.

It is yet another object of this invention to provide a method for the preparation of these compounds.

Various other objects and advantages of the present invention will become apparent to those skilled in the art from the accompanying description and disclosure.

According to my invention, the above objects are accomplished through the preparation of novel polyhalogenated sulfonate ester compounds. These compounds are prepared in accord with the method of my invention through reacting halogenated ketones and sulfene intermediates which are generated in situ by methods known to the art.

The method of my invention prepares polyhalogenated sulfonate esters which are either a new class of β-sultones or a new class of alkenyl sulfonates from the addition of sulfenes to halogenated ketones. β-sultones, for example, are formed from the addition of sulfene to hexahaloacetones, however, 1,1,1-trihaloacetones do not yield sultones, but yield instead the novel 1-trihalomethylvinylmethane sulfonates.

A β-sultone having the formula

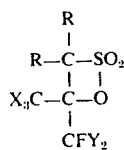

is produced by the reaction of a halogenated ketone having the formula $CX_3COCFY_2$ with a sulfene having the formula $R_2C=SO_2$, where each X is fluorine or chlorine; each Y is hydrogen, fluorine, or chlorine, not more than one Y being hydrogen and not more than one Y being fluorine; and each R is hydrogen, fluorine, chlorine, bromine, or hydrocarbyl having up to and including about 12 carbon atoms and selected from alkyl, cycloalkyl, aryl, and combinations thereof such as alkaryl, aralkyl, and the like.

A sulfonate having the formula

is produced by the reaction of a halogenated ketone having the formula $CH_2Y'COCX'_3$ with a sulfene having the formula $R_2C=SO_2$, where each X' is fluorine, chlorine, or bromine; Y' is hydrogen, X', or alkyl having 1 to about 10 carbom atoms; and R is as defined above.

In the process of this invention, a sulfene intermediate, for example, is generated in situ by the action of a tertiary amine, a trialkylamine such as triethylamine, on a sulfonyl halide. The sulfonyl halide which is used to generate the sulfene intermediate is represented by the formula $R_2CHSO_2X''$, where each R is as defined above and X'' is chlorine or bromine. Although triethylamine is the preferred tertiary amine, other tertiary amines such as trialkylamines having 3 to 18 carbon atoms or more can be used in the production of the sulfene.

When a sulfonyl chloride is employed to produce the sulfene intermediate in situ, exemplary molar ratios of sulfonyl chloride to halogenated ketone are within the range of about 0.1:1 to 10:1, preferably being within the range of about 0.5:1 to 5:1. In the generation of the sulfene in this manner, an exemplary molar ratio of tertiary amine to halogenated ketone is within the range of about 0.1:1 to 10:1, preferably about 0.5:1 to 5:1. The sulfene can be generated in situ by the slow addition of tertiary amine to the mixture comprising sulfonyl chloride and halogenated ketone under the conditions described below for the reaction of the sulfene intermediate with the halogenated ketone.

Although the reaction temperature can vary over a broad range generally it will be within the range of about −50°C to 100°C, preferably being within the range of about −20°C to 50°C. Although the reaction time can vary considerably, depending in part on the reaction temperature, it generally will be within the range of not less than 5 minutes and not more than 24 hours, preferably within the range of not less than 30 minutes and not more than 6 hours. Preferably, a solvent is employed, examples of suitable solvents are as follows: an ether such as diethyl ether, dibutyl ether, or tetrahydrofuran; an aromatic hydrocarbon such as benzene or toluene; a halogenated aliphatic hydrocarbon such as methylene chloride, chloroform, or carbon tetrachloride. The pressure need be only sufficient to maintain the reactants and solvent substantially in the liquid phase. The sultone and sulfonate products can be isolated from the reaction mixtures through the use of conventional techniques such as distillation, crystallization, sublimation chromatography, and the like.

In order to illustrate methods by which the new compositions of this invention are prepared, the following examples are presented below in which analytical data substantiating the structural formula of these compounds are given. It is to be understood that these examples are provided by way of illustration and are not to be considered as unnecessarily limiting the invention.

EXAMPLE I 2,2-Bis(difluorochloromethyl)-2-hydroxyethanesulfonic acid β-sultone - In 125 ml of dry ether were placed 11.6 g (0.05 mol) 1,3-dichlorotetrafluoroacetone and 17.2 g (0.15 mol) methanesulfonyl chloride, and the mixture was cooled to 5°C. Triethylamine (5.05 g, 0.05 mol) dissolved in 25 ml ether was added over a period of 65 minutes. After stirring an additional 1 hour, the precipitate ($Et_3N·HCl$, 6.2 g, 89 percent) was removed, and the filtrate was concentrated to a golden oil (26.4 g). Distillation gave 10.8 g of recovered methanesulfonyl chloride, boiling point 39°–47°C (3.0 mm mercury) and 8.6 g (0.031 mol) of product, 2,2-bis(difluorochloromethyl)-2-hydroxyethanesulfonic acid β-sultone, boiling point 60°C (1.2 mm mercury), $n_D^{20}$ 1.4166, representing a 62 percent yield, leaving 1.88 g of residue in the pot.

The infrared spectrum of the product indicated strong bands at 7.2, 8.15, 8.70, 9.2, 10.62, 13.5, and 14.5 microns. No carbonyl or olefinic peaks were observed. Two weak bands at 3.30 and 3.38 microns were observed. N.m.r. illustrated one sharp singlet at 4.90 tau. and $F^{19}$ a singlet at −17.9 tau.

Analysis. Calculated for $C_4H_2Cl_2F_4O_3S$: C, 17.34; H, 0.73; Cl, 25.60; S, 11.58; M.W. 277. Found: C, 17.28; H, 0.78; Cl, 25.15; S, 11.92; M.W. 275 (vapor density).

EXAMPLE II

2-Dichlorofluoromethyl-2-difluorochloromethyl-2-hydroxyethanesulfonic acid β-sultone - In 125 ml dry ether were placed 10.8 g (0.05 mol) 1,1,3-trichlorotrifluoroacetone and 17.16 g (0.15 mol) methanesulfonyl chloride. After cooling to 0°–5°C, 5.05 g (0.05 mol) triethylamine was added over a period of 72 minutes. After stirring an additional 5 minutes, the mixture was filtered to give 6.22 g (90 percent) of $Et_3N·HCl$. Distillation of the filtrate gave 10.47 grams of mesyl chloride and 9.48 g (88 percent yield) product, 2-dichlorofluoromethyl-2-difluorochloromethyl-2-hydroxyethanensulfonic acid β-sultone, boiling point 79°–80°C (1.0 mm mercury), $n_D^{20}$ 1.4520. A second distillation of the product at 64°C (0.2 mm mercury) gave a pure product, $n_D^{20}$ 1.4515. The infrared spectrum of the purified product exhibited strong peaks at 7.20, 8.15, 10.8, 11.5, 12.0, 13.6 and 14.65 microns. Proton n.m.r. gave one singlet at 4.88 tau. and the $F^{19}$ gave a triplet at −17.0 tau., area 1.0, $J_{cps}$ 9.0; and a pair of doublets at −21.7 tau., area 2.0; $J_{cps}$ 9.0 and 5.3.

Analysis. Calculated for $C_4H_2Cl_3F_3O_3S$: C, 16.37; H, 0.69; Cl, 36.24; S, 10.92; M.W., 293.5. Found: C, 16.28; H, 0.72; Cl, 36.60; S, 11.48; M.W., 291 (vapor density).

EXAMPLE III 2,2-Bis(dichlorofluoromethyl)-2-hydroxyethanesulfonic acid β-sultone- In 170 ml of ether were placed 11.6 g (0.05 mol) 1,3-difluorotetrachloroacetone and 17.16 g (0.15 mol) methanesulfonyl chloride followed by dropwise addition at about 10°C of 5.05 g (0.05 mol) of triethylamine dissolved in 40 ml of ether. Time of addition was 70 minutes with the mixture being stirred an additional 10 minutes. On work-up 6.3 g (91 percent of theory) of $Et_3N·HCl$ was obtained. Distillation gave 11.00 g of mesyl chloride and 8.52 g (55 percent) of product, 2,2-bis(dichlorofluoromethyl)-2-hydroxyethanesulfonic acid β-sultone, boiling point 85°–95°C (0.3 mm mercury), $n_D^{20}$ 1.4848, and a pot residue of 1.95 g. Redistillation gave an analytical sample, boiling point 76°–77°C (0.15 mm mercury), $n_D^{20}$ 1.4855. The infrared spectrum of the redistilled product was very similar to that of the products in the preceding examples. The proton n.m.r. exhibited a singlet at 4.79 tau (impurity at 6.63 tau) and the $F^{19}$ gave three singlets (rel area) at −21.2 tau (3), −25.7 tau (1), −26.2 tau (1).

Analysis. Calculated for $C_4H_2Cl_4F_2O_3S$: C, 15.50; H, 0.65; Cl, 45.76; S, 10.32; M.W., 310. Found: C, 15.62; H, 0.77; Cl, 45.84; S, 11.24; M.W., 311 (vapor density).

EXAMPLE IV

2-Difluoromethyl-2-trifluoromethyl-2-hydroxyethanesulfonic acid β-sultone - Triethylamine (10.1 g, 0.10 mol) dissolved in 30 ml ether was added dropwise over a period of 2 hours to a mixture of pentafluoroacetone (15.0 g, 0.10 mol) and methanesulfonyl chloride (11.4 g, 0.10 mol) in 200 ml ether at 0°–5°C. A dry ice condenser was used to prevent escape of the volatile ketone (bp 12° C). After stirring an additional 30 minutes, the $Et_3N·HCl$ (9.2 g) was filtered off, and the ether was evaporated to give 23.95 g of a pale yellow liquid. From this liquid was distilled a fraction (5.22 g), bp 42°–46°C (1.0 mm mercury), $n_D^{20}$ 1.3744, which was redistilled to give 1.68 g of product, 2-difluoromethyl-2-trifluoromethyl-2-hydroxyethanesulfonic acid β-sultone, bp 64°–65.5°C (3.5 mm mercury), $n_D^{20}$ 1.3729.

Analysis. Calculated for $C_4H_3F_5O_3S$: C, 21.24; H, 1.34; S, 14.18. Found: C, 20.7; H, 1.6; S, 15.00; Cl, 1.1.

Since 1.1 percent chlorine was present, an impurity of 8 percent maximum of unreacted methanesulfonyl chloride was present, which explains the high sulfur and low carbon values found. The n.m.r. indicated a mixture of 92 percent (1) and 8 percent methanesulfonyl chloride (singlet at 6.33 tau). That the structure is (1)

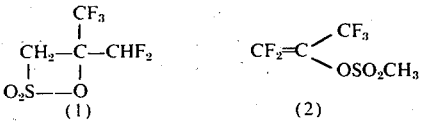

and not (2) was supported by the n.m.r. in that a triplet was observed at 3.75 tau with J = 53 cps. The separation is typical of gem coupling of hydrogen nuclei with fluorine atoms. The position of the resonance is also consistent with the structure shown. The AB system centered at 5.05 tau represents the nonequivalent protons of a methylene group, and the chemical shift indicates structure (1).

EXAMPLE V

1-Trifluoromethylvinyl methanesulfonate - A 4-necked 2-liter flask fitted with a stirrer, addition funnel, thermometer, and condenser was dried in an oven and cooled under $N_2$. The flask was charged with 1 liter of dry ether, 56 g (0.50 mol) 1,1,1-trifluoroacetone, and 57.2 g (0.50 mol) methanesulfonyl chloride and cooled to 10°C. Triethylamine (51.0 g, 0.51 mol) dissolved in 200 ml of ether was added dropwise over a period of 2.5 hours. After stirring an additional 1.5 hours, 69.1 g of $Et_3N·HCl$ was filtered, and evaporation of the solvent left 89.4 g of crude product. Distillation gave 3.9 g of forerun distilling at 52°–53°C (5.0 mm mercury), $n_D^{20}$ 1.3870, and a heart cut of 71.1 g (75 percent) of 1-trifluoromethylvinyl methanesulfonate, boiling point 53°–54°C (5.0 mm mercury). For an analytical sample the heart cut was redistilled to give 63.8 g of pure product, boiling point 54°C (4.5 mm mercury), $n_D^{20}$ 1.3806. The infrared spectrum of the product was very significant and unlike the spectra of the products of the preceding examples; there were strong bands at 6.01 (1660 cm$^{-1}$) (vinyl), 7.32, 7.52, 8.42, 9.00, 10.46 and 12.35 microns. Proton n.m.r. gave 2 singlets (rel area), 4.34 tau (2.0) and 6.79 tau (3.2); F$^{19}$ gave one singlet at −5.73 tau.

Analysis. Calculated for $C_4H_5F_3O_3S$: C, 25.26; H, 2.65; S, 16.86; M.W., 190. Found: C, 25.00; H, 2.61; S, 17.16; M.W., 188.

EXAMPLE VI

1-Trichloromethylvinyl methanesulfonate - A 4-necked 2-liter flask fitted with a stirrer, addition funnel, thermometer, and condenser was dried in an oven and cooled under nitrogen. The flask was charged with 800 ml ether, 121 g (0.75 mol) 1,1,1-trichloroacetone, and 85.8 g (0.75 mol) methanesulfonyl chloride and cooled to 0°–10°C. Triethylamine (76.5 g, 0.75 mol) dissolved in 150 ml ether was added over a period of 1 hour at 0°–10°C. After stirring an additional hour, the light yellow solution was filtered, and the filtrate was concentrated to 154.5 g. Distillation gave 50.2 g of unreacted ketone (boiling point 32°C at 1.5 mm mercury). The brown residue was distilled to give 35.13 g (20 percent yield) of 1-trichloromethylvinyl methanesulfonate, boiling point 94°–97°C at 0.5 mm mercury. Redistillation gave an analytical sample, boiling point 86°C at 0.3 mm mercury, mp 36°–38°C. The infrared spectrum indicated a strong vinyl band (6.1 microns) in addition to the weak =CH$_2$ band at 3.22 microns and the sulfone bands at 7.4 and 8.6 microns. The n.m.r. spectrum was also consistent with the assigned structure.

Analysis. Calculated for $C_4H_5O_3SCl_3$: C, 20.04; H, 2.09; S, 13.36; M.W., 239.5. Found: C, 20.26; H, 2.19; S, 13.3; M.W., 238 (osmometer).

According to the method of this invention the following simplified example reactions produced the yields as indicated. These reactions and yields are for illustrative purposes only and are not limitations upon the scope of my invention.

| Ex. | Reaction | Yield |
|---|---|---|
| I | $ClF_2CCOCF_2Cl + [CH_2=SO_2] \rightarrow ClF_2C-\underset{CF_2}{\underset{|}{C}}\overset{CH_2-SO_2}{\overset{|\quad\;\;|}{-}}O$ | 62% |
| II | $Cl_2FCCOCF_2Cl + [CH_2=SO_2] \rightarrow Cl_2FC-\underset{CF_2Cl}{\underset{|}{C}}\overset{CH_2-SO_2}{\overset{|\quad\;\;|}{-}}O$ | 88% |
| III | $Cl_2FCCOCFCl_2 + [CH_2=SO_2] \rightarrow Cl_2FC-\underset{CFCl_2}{\underset{|}{C}}\overset{CH_2-SO_2}{\overset{|\quad\;\;|}{-}}O$ | 55% |
| IV | $F_3CCOCHF_2 + [CH_2=SO_2] \rightarrow F_3C-\underset{CHF_2}{\underset{|}{C}}\overset{CH_2-SO_2}{\overset{|\quad\;\;|}{-}}O$ | Low Yield |
| V | $CF_3COCH_3 + [CH_2=SO_2] \rightarrow CH_2=\underset{}{\overset{CF_3}{\overset{|}{C}}}OSO_2CH_3$ | 75% |
| VI | $CCl_3COCH_3 + [CH_2=SO_2] \rightarrow CH_2=\underset{}{\overset{CCl_3}{\overset{|}{C}}}OSO_2CH_3$ | 20% |

Selected β-sultones of my invention were tested and found to have utility as agricultural chemicals; for example, selected β-sultones were demonstrated to be effective rusticides against corn and bean rust. A selected alkenyl sulfonate of my invention was tested for agricultural chemical utility and was found to be effective as a rusticide against bean rust.

What I claim is:

1. A process for preparing 1-trifluoromethylvinyl methanesulfonate comprising: contacting 1,1,1-trifluoroacetone with a sulfonyl halide having the formula $R_2CHSO_2X''$ and a tertiary amine wherein $X''$ is chlorine or bromine, and R is hydrogen.

2. As a composition of matter, 1-trifluoromethylvinyl methanesulfonate.

* * * * *